United States Patent [19]

Van Gompel

[11] Patent Number: 4,801,228
[45] Date of Patent: Jan. 31, 1989

[54] BANDABLE CARGO RESTRAINING DEVICE

[75] Inventor: James J. Van Gompel, Fremont, Ind.

[73] Assignee: N P Marketing Corporation, Neenah, Wis.

[21] Appl. No.: 131,341

[22] Filed: Dec. 9, 1987

Related U.S. Application Data

[63] Continuation of Ser. No. 898,760, Aug. 13, 1986, abandoned, which is a continuation of Ser. No. 507,796, Jun. 24, 1983, abandoned.

[51] Int. Cl.⁴ .................. B65D 19/08; B65D 19/00
[52] U.S. Cl. ................................ 410/94; 410/99; 108/55.5
[58] Field of Search ............... 410/41, 51, 94, 97–100, 410/121, 129, 96; 108/51.1, 55.1, 55.5; 414/446, 448, 449; 280/47.28

[56] References Cited

U.S. PATENT DOCUMENTS

| | | | |
|---|---|---|---|
| 1,574,501 | 2/1926 | O'Brien | 108/55.1 X |
| 1,807,128 | 5/1931 | Munoz et al. | 414/446 |
| 2,623,760 | 12/1952 | Furnelius | 108/55.5 X |
| 2,686,646 | 8/1954 | McMillan | 108/55.5 X |
| 2,839,198 | 6/1958 | Lefevre | 108/55.1 |
| 2,849,241 | 8/1958 | Owen | 410/51 X |
| 2,917,261 | 12/1959 | Stough | 108/55.1 |
| 3,699,900 | 10/1972 | Carlson | 108/55.1 X |
| 3,762,341 | 10/1973 | Adler | 410/97 X |
| 4,111,132 | 9/1978 | Plut | 410/97 |
| 4,147,112 | 4/1979 | Green et al. | 410/94 |
| 4,193,736 | 3/1980 | Thomaswick | 410/121 X |
| 4,317,645 | 3/1982 | VanGompel | 410/94 |
| 4,338,053 | 7/1982 | Abel | 410/94 |

Primary Examiner—Robert B. Reeves
Assistant Examiner—Scott H. Werny
Attorney, Agent, or Firm—Stefan J. Klauber

[57] ABSTRACT

A device for securely restraining cargo during transport, comprising a generally planar platform member supported in spaced relation from an underlying floor, and having an upper load bearing surface for receiving a cargo load thereupon, and an upright member being adjoined to one end of said platform member for effecting restraining contact with the adjacent side of the load seated on said platform member; said upright member including a generally planar member facing said load which is provided with a plurality of vertically spaced horizontal parallel slots therethrough, whereby straps may be passed beneath said platform member and then about the load seated thereupon and securely fastened in contact with said load by being passed through a horizontal slot at said upright member in accordance with the height of the said load seated on said platform member.

1 Claim, 4 Drawing Sheets

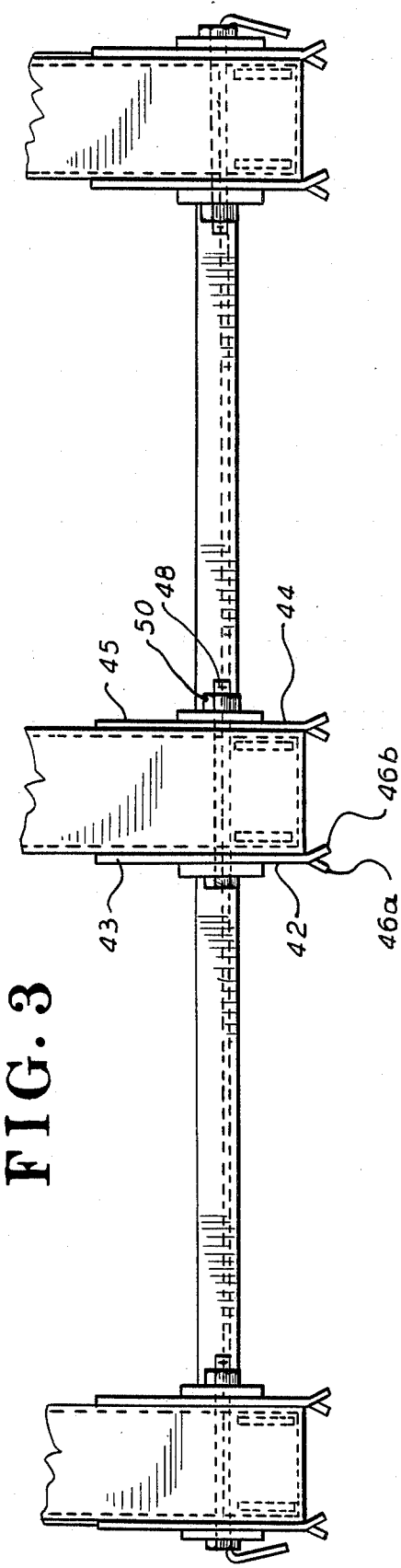
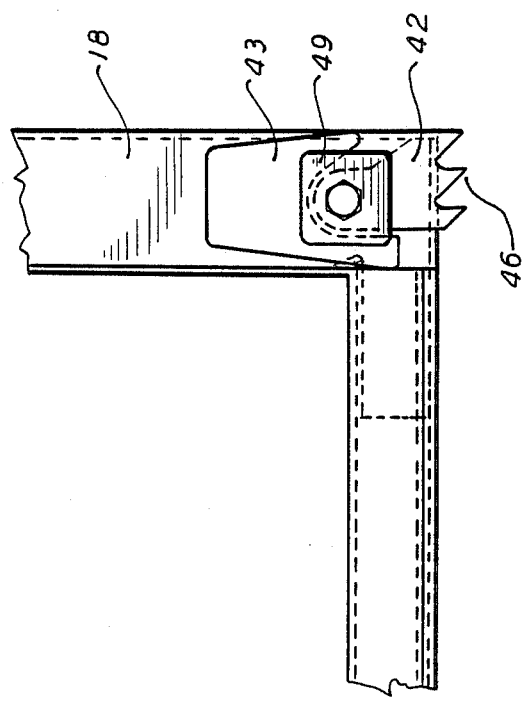
FIG. 3
FIG. 4

BANDABLE CARGO RESTRAINING DEVICE

This application is a continuation of application Ser. No. 06/898,760, filed on Aug. 13, 1986 and now abandoned, which is a continuation of application Ser. No. 06/507,796, filed on June 24, 1983, also abandoned.

BACKGROUND OF THE INVENTION

1. Field of the Invention

This invention relates to a device for securely restraining cargo during transport, and in particular, to a device for securely restraining a load of cargo to prevent movement thereof which could result in damage.

2. Background of the Invention

Unless a cargo load is adequately secured within its vehicular carrier, motion of the vehicle, especially including acceleration and deceleration of same, tends to move or shift the cargo with consequent damage to same, and often as well, damage to the carrier. Heretofore, shippers have generally found it necessary to rely on banding, blocking, or bracing to secure the cargo load and provide for its integrity. Such practices, however, are not only time-consuming to install and costly, but also rely heavily on individual judgment for their adequacy.

Certain types of hazardous cargo, notably munitions, are of particular concern; they must be securely restrained during transport to avoid accidental detonations caused by jarring, or inadvertent physical contact between portions of the cargo.

Within the last several years, a new class of devices have come into use which are generally useful in restraining loads of cargo during transport. These are exemplified by U.S. Pat. Nos. 4,147,112 and 4,317,645, each assigned to the assignee of the present application.

U.S. Pat. No. 4,147,112, issued to Green et al, thus relates to a cargo support or retainer which endeavors to avoid banding, blocking, or bracing of palletized cargo loads, by providing a substantially L-shaped frame, wherein the lower horizontal member which contacts the floor is provided with a plurality of "anti-skid" spikes to resist movement of the palletized load during transport.

A further such cargo restraining device is disclosed in said U.S. Pat. No. 4,317,645 issued to James Van Gompel. In this deice, an elongated floor contacting member is provided with an upwardly facing load-bearing surface, the member being adapted to project forwardly beneath a portion of the cargo load. A generally upright member is secured to the floor contacting member in spaced relation from the forward end of the floor contacting member for engaging with the cargo load, and a floor piercing element is movably mounted on the floor contacting member adjacent to the rearward end thereof. The floor piercing element is normally disposed to pierce the floor when the floor contacting member of the restraining device is under load in service, and is movable to a position incapable of piercing the floor when the restraining device is out of service. Like the device disclosed in the Green et al patent, this device is intended to resist movement of the palletized load during transport.

U.S. Pat. No. 3,699,900 to Carlson, also describes a device for use in the transport, handling and storage of materials. This device has a base portion and a first wall portion, either of which may be utilized in the lifting and transporting of the device. A pair of opposed spaced side panels are provided between the base portion and the first wall portion, for confining and protecting the material on said device.

These devices, while suitable for the transport of cargo requiring no special handling, can afford less than satisfactory safeguards against movement of portions of the cargo relative to one another which might result in damage to, or destruction of the cargo. A particular problem is thus presented where the height of the load is such as to not match reasonably well with the overall height of the device. Under such circumstances the banding used to secure the load to the restraining device may not be snugly fitted to the load, thereby permitting a degree of shifting—which can be particularly dangerous with hazardous loads such as munitions.

OBJECTS OF THE INVENTION

In accordance with the foregoing, it may be regarded as an object of the present invention, to provide a device for use in restraining cargo loads during vehicular transport, which is of unusual efficacy, as to render same of special value in the transport of hazardous loads such as munitions.

It is a further object of the invention, to provide a cargo restraining device of the foregoing character, which is adapted for very effectively restraining cargo loads irrespective of the height of the load.

SUMMARY OF THE INVENTION

Now in accordance with the present invention, the foregoing objects, and others as will become apparent in the course of the ensuing specification, are achieved in a device for securely restraining cargo during transport, comprising a generally planar platform member supported in spaced relation from an underlying floor, and having an upper load bearing surface for receiving a cargo load thereupon; and an upright member adjoined to one end of said platform member for effecting restraining contact with the upright member. The upright member includes a generally planar member facing the load which is provided with a plurality of vertically spaced horizontal slots therethrough, whereby straps may be passed beneath said platform member and then about the load seated thereupon, and securely fastened in contact with the load by being passed through a said horizontal slot in accordance with the height of the load. Downwardly facing surface gripping projections are provided at the bottom of the restraining device, to limit its movement (and that of the load) with respect to the underlying floor.

In a preferred embodiment of the invention, the cargo restraining device may comprise a plurality of mutually spaced, generally L-shaped support beams, a generally planar platform member being supported upon the horizontal legs of the said L-shaped members in spaced relation to the underlying floor. The platform member has an upper load bearing surface adapted to receive a cargo load thereupon. An upright member is adjoined to one end of the platform member for restraining the adjacent side of the load seated on the platform member. The upright member is secured to the vertical legs of the L-shaped members, and the upright member includes a generally planar portion facing the load, which is provided with a plurality of vertically spaced parallel slots therethrough.

By virtue of this arrangement, strap members may be passed beneath the platform member, thence about the load, and thence through selected of the slots in accordance with the height of the load, and the ends thereupon connected to tightly secure the load to the cargo restraining device.

The downwardly facing portion at the bends of the L-shaped members may be provided with surface gripping projections, to limit movement of the cargo restraining device and load with respect to the underlying floor. These projections can comprise teeth provided at metal plates which are secured to the L-shaped members. The teeth may be sawtoothed in shape, and formed as rows at the lateral edges of the metal plates.

The generally planar member can comprise a plurality of laterally joined, generally rectangular pieces, which include cut-out portions at the lines of lateral joining which define the slots for passage of the strapping. An uppermost rectangular section can also be provided, which at the upper edge carries a pair of bent over pieces for enabling the straps to be passed thereover to provide a widened support surface for same.

The downwardly facing portion of the horizontal legs of the L-shaped members remote from the bend of the L, preferably carries additional surface gripping projections.

BRIEF DESCRIPTION OF THE DRAWINGS

The invention is diagrammatically illustrated, by way of example, in the drawings appended hereto, in which:

FIG. 3 is a partial, lower end elevational view, showing further details of the floor gripping means utilized in the invention;

FIG. 4 is a partial lower end elevational view showing details of the "L" junction;

DESCRIPTION OF THE PREFERRED EMBODIMENT

Figure 1:
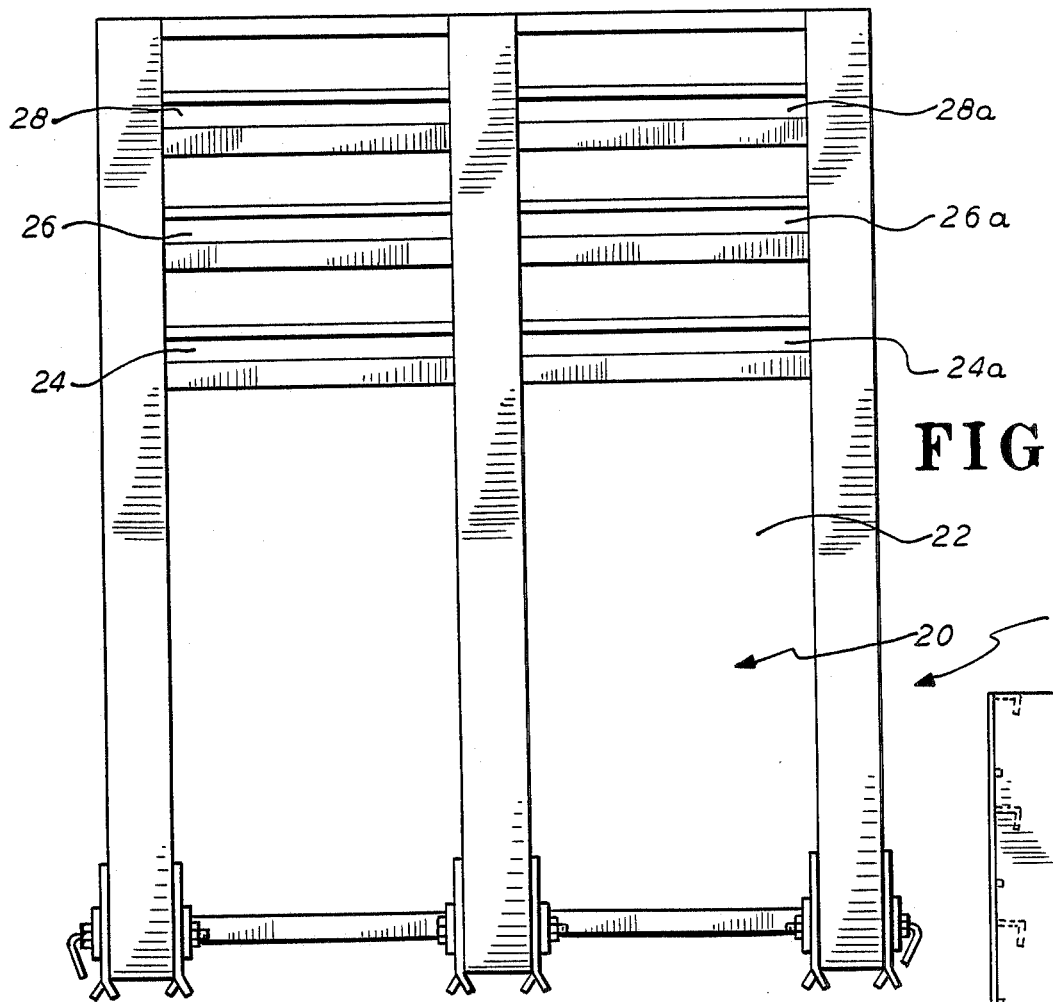
FIG. 1 is an end elevational view of a cargo restraining device according to the present invention.
Figure 2:
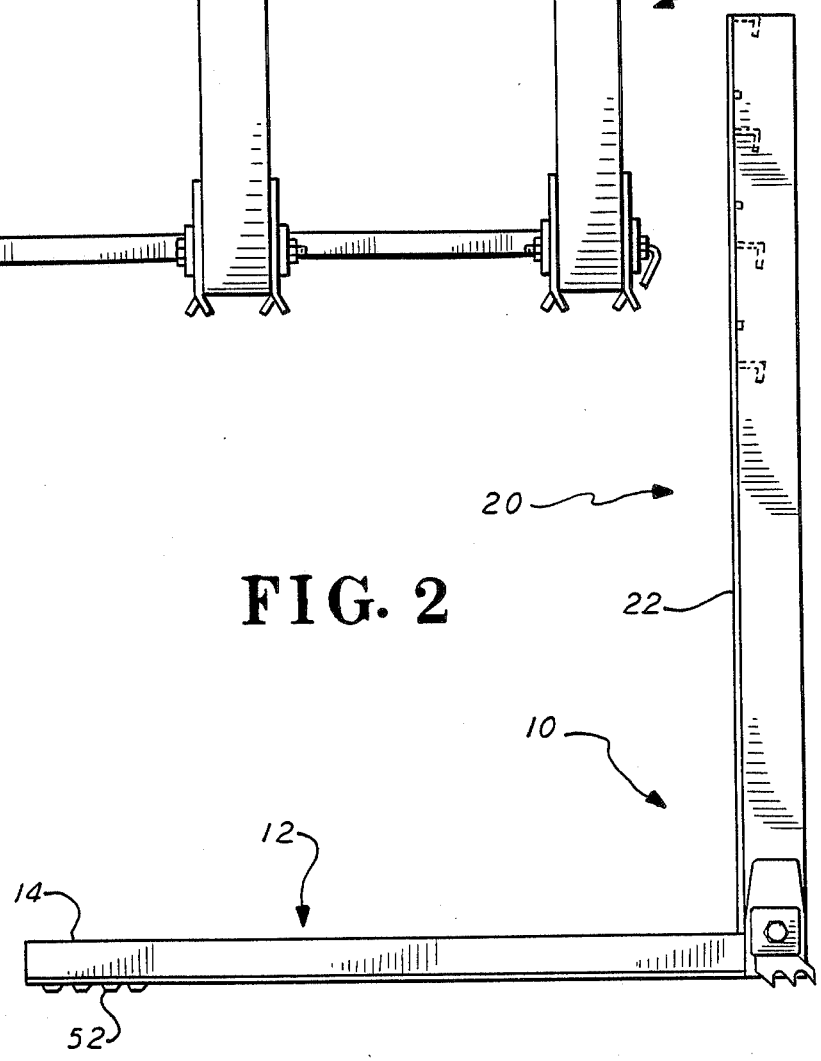
FIG. 2 is a side elevational view of the cargo restraining device of FIG. 1.
Figure 6:
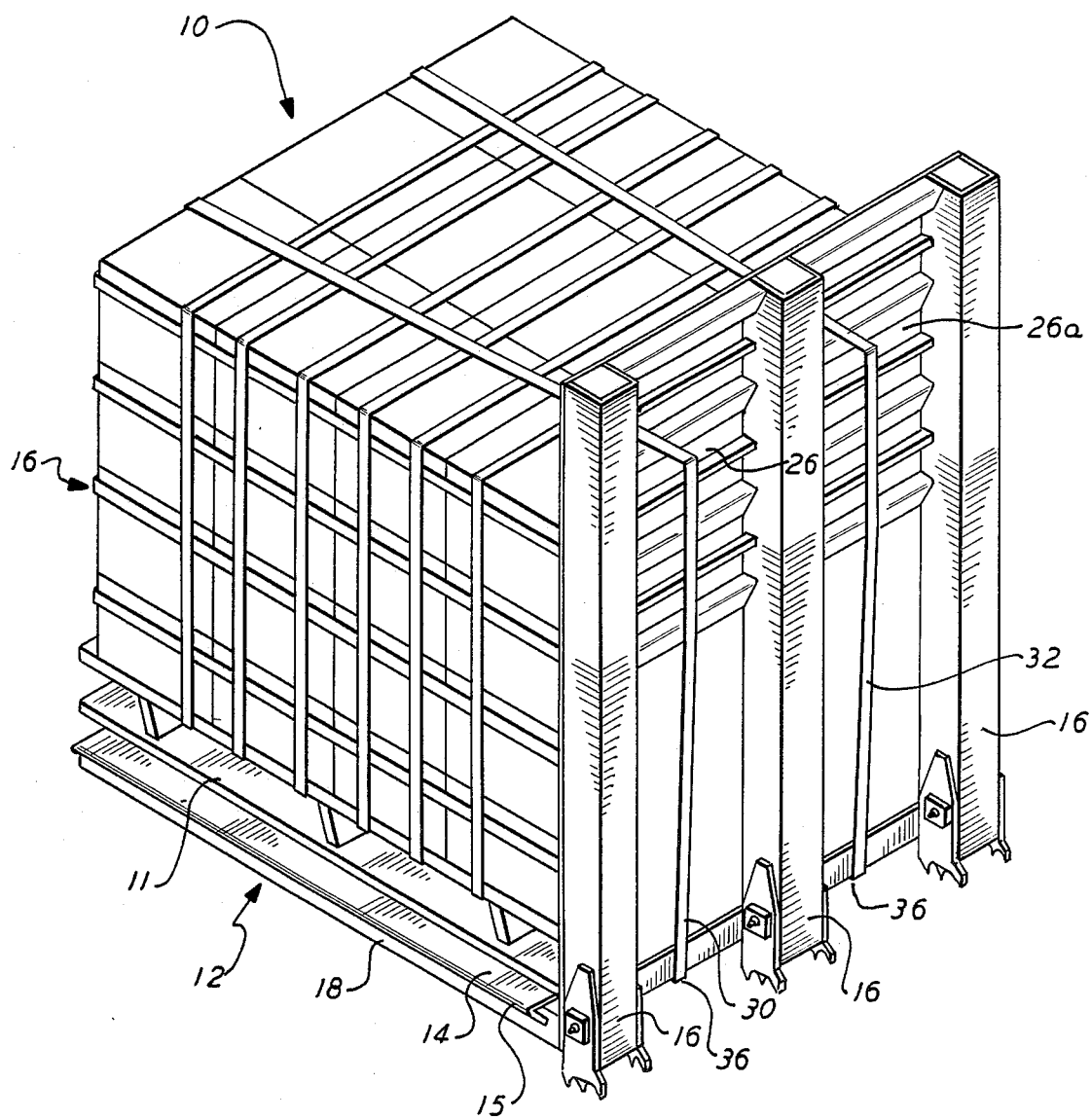
FIG. 6 is an assembled view, in perspective, of the cargo restraining device according to the invention, in use with a palletized load.

The cargo restraining device 10, best seen in its totality in FIGS. 1, 2, and 6, comprises a generally planar platform member 12, having an upper load bearing surface 14 for receiving a cargo load 16 thereupon, as seen in FIG. 6. Cargo load 16 may comprise a palletized load (i.e., a load secured to a pallet 11) in consideration of the exceptional convenience provided where such load is palletized; however, the present device is equally effective when utilized with other types of loads. Load 16 may be a hazardous material, as for example, a load of munitions or other material, which is subject to damage or destruction if it should, to any extent, be moved accidentally during shipment. The present device is especially adapted for restraining loads of this type, which are not as effectively maintained in place by prior restraining devices as aforementioned.

Figure 5:
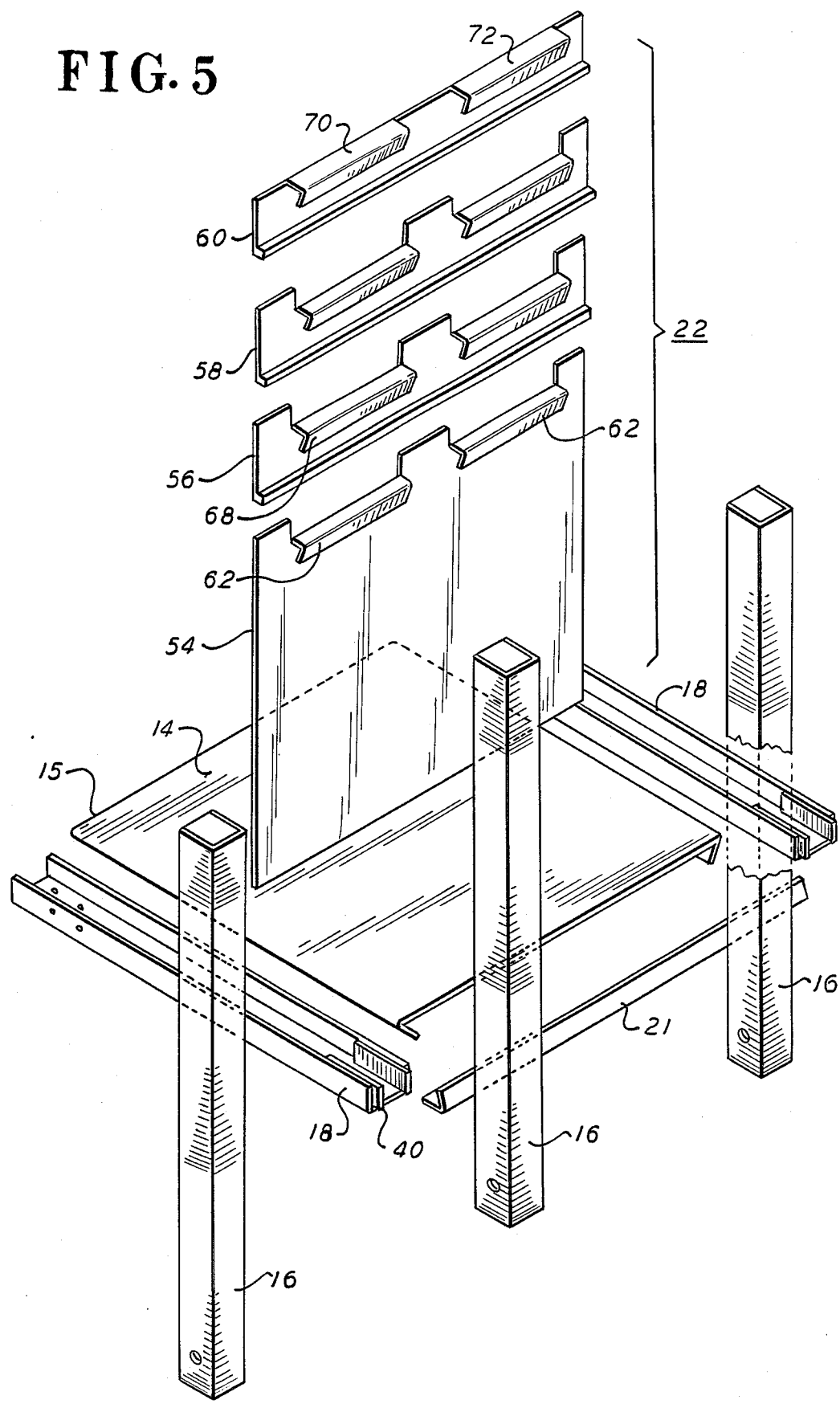
FIG. 5 is an exploded view, in perspective, of the cargo restraining device of the invention.

As may be best appreciated by reference to the exploded view of FIG. 5 taken in conjunction with FIGS. 1 and 2, the device 10 is formed from a plurality of spaced generally L-shaped support beams, each of which comprise a vertical member 16, and a horizontal member 18, which defines the horizontal leg of the L. The generally planar platform piece 15 is supported upon the horizontal legs or members 18, and is maintained thereupon by welding or other suitable joining operations. The platform piece 15 is thereby maintained in spaced relation to an underlying support floor.

An upright member 20 is adjoined to one end of the platform member 12 for effecting restraining contact with the adjacent side of the load seated on the platform member. Upright member 20 is secured to the vertical legs 16 of the L-shaped members, and includes a generally planar portion 22 facing the load, which is provided with a plurality of vertically spaced parallel slots 24, 24a, 26, 26a, 28, and 28a, which define openings through the member 20.

By virtue of such arrangement, and as may best be seen in FIG. 6, strap members 30 and 32 may be passed beneath the platform member 14 as at 34 and 36, and thence about the load passing finally through selected slots, as for example in FIG. 6, where the said straps pass through the slots 26 and 26a, with the ends of the straps being secured to each other by any convenient means, as for example by belt and buckle arrangements or other banding means. Because of the various possibilities presented by the multiple horizontal slots 24, 26, etc., the straps may be passed through appropriate slots in accordance with the height of the load so that a very tight and snug interfit is achieved about the total load 16, thereby maintaining same in extremely snug and secure contact with the cargo restraining device 10.

The L-shaped members consist of the vertical members 16 and horizontal members 18, which are, as aforementioned, welded to one another to form the continuous L-shaped members. As shown in FIG. 5, a gusset 40 is provided where the L juncture occurs to enable good reinforcing effect at such zone.

Referring particularly to FIGS. 1 through 4, it will be seen that the present device 10 is provided with a plurality of floor gripping projections, preferably in the form of appropriately shaped teeth or the like, at the downwardly facing portion of the L-junctions. More specifically it is seen, referring especially to FIGS. 3 and 4, that cleat plates 42 and 44 are provided, which carry at their bottommost edges a plurality of sawtooth shaped teeth 46. Plates 42 and 44 are retained within cleat guides 43 and 45 which are welded to legs 18, and are secured by bolts 48, washers 49 and nuts 50 to the bottom of the said L-juncture. As seen in FIG. 3, the teeth 46 at the bottom of a particular plate, may be bent to alternate sides of the vertical plane, i.e., successive teeth 46a, 46b, are so bent in the row of teeth, so as to introduce additional stability tending to preclude side-to-side or lateral swaying of the load seated upon the cargo restraining device.

It will be clear that the arrangement of the sawtooth shaped teeth is such as to sharply limit displacement of the restraining device carrying the load in a rearward direction, i.e. movement toward the right in the sense of FIG. 2. Under such circumstances, the sawtooth shaped teeth will dig into the underlying support floor.

To provide additional resistance to movement, further projections, such as teeth or the like, may be provided at the bottom surface of the front end of horizontal legs 18, as shown in FIG. 2 at 52.

The portion 22 constituting the rearward support planar piece, as best seen in FIG. 5, may be formed from a plurality of generally rectangular pieces 54, 56, 58, and 60, which pieces are laterally joined, as for example by welding. These pieces 54, 56, etc., include cutout portions formed by bending over the metal cutouts, as for example at 62, 68, etc. These cutout portions, upon lateral joining, define the aforementioned horizontal slots 24, 26, etc. The bent-over portion, as at 62, provides a widened support where the strap passes through the slot to prevent undue wear or strain upon same. This same result obtains at the topmost rectangular piece 60 where bent-over portions 70 and 72 are provided; i.e. when strapping passes about the topmost edge of backing member 20, the extended portions 70 and 72 again prevent undue strain upon the strapping.

The vertical members 16 are secured to the member 20 and to the platform backing piece 21, by being welded thereto. While the present device has been shown with three L-shaped support members, other numbers, such as two, or numbers greater than three, can be readily utilized.

As aforementioned, while the present device is particularly useful in connection with hazardous loads, such as ammunitions and the like, it is of such efficacy in restraining loads, that it is well suited to any type of palletized or non-palletized load.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

I claim:

1. A self-sustaining device for securely restraining a cargo load transport, comprising a pair of laterally spaced-apart horizontal legs,
    a generally planar platform member supported horizontally upon said legs and secured thereto in spaced relation to an underlying floor, and having an upper load-bearing surface for receiving a cargo load thereupon:
    a vertical member secured to an end of each of said horizontal legs to define L-shaped support beams;
    a third vertical member substantially intermediate said L-shaped support beams;
    a cross-bar secured to and interconnecting said L-shaped support beams and said third vertical member;
    an upright unit vertically adjoined to one end of said platform member and secured to said vertical members for effecting restraining contact with the adjacent side of the load seated on said platform member; said upright unit including a first generally planar element extending upwardly from said platform member, a plurality of second generally planar elements superposed above said first element, and an uppermost generally planar element above said second elements, all of said elements lying in substantially coplanar relationship to define a backing panel extending across the back of said platform member and upwardly from said platform member to the top of said element, said first and second elements having cut-out portions along their edges adjoining each other to define in said upright unit a plurality of vertically-spaced horizontal elongate parallel slots therethrough extending between each of said vertical members and positioned to receive straps passed beneath said platform member and then about the load seated thereupon and securely fastened in contact with said load by being passed through at least one elongate horizontal slot in said upright unit in accordance with the height of said load seated on said platform member; said second elements being formed from metal and said cut-out portions being defined by integral sections of said elements cut and bent over rearwardly away from said platform member to provide a widened support where said straps pass through said slots, to prevent undue wear or strain upon said straps, the upper edge of said uppermost element of said upright unit member being formed at its upper edge with bent-over pieces to provide a widened support surface for straps passed thereover, and said device including downwardly-facing surface-gripping projections at the bottom thereof, to limit movement of said device and load with respect to the underlying floor.

* * * * *